(12) United States Patent
Migliorini et al.

(10) Patent No.: US 6,824,878 B2
(45) Date of Patent: Nov. 30, 2004

(54) METHOD FOR PREPARING SEALABLE FILMS WITH SILOXANE ADDITIVES

(75) Inventors: Robert A. Migliorini, North Haven, CT (US); Karen A. Sheppard, Victor, NY (US)

(73) Assignee: ExxonMobil Oil Corporation, Fairfax, VA (US)

(*) Notice: Subject to any disclaimer, the term of this patent is extended or adjusted under 35 U.S.C. 154(b) by 0 days.

(21) Appl. No.: 09/879,448

(22) Filed: Jun. 12, 2001

(65) Prior Publication Data

US 2003/0008153 A1 Jan. 9, 2003

(51) Int. Cl.$^7$ .............................................. B32B 9/04
(52) U.S. Cl. ........................ 428/447; 428/213; 428/349; 428/516; 428/910; 526/348.1; 526/351; 526/943; 264/173.15; 264/235.8; 264/290.2
(58) Field of Search ................................. 428/213, 349, 428/515, 516, 910, 447; 526/348.1, 351, 943; 264/173.15, 235.8, 290.2

(56) References Cited

U.S. PATENT DOCUMENTS

| | | | |
|---|---|---|---|
| 4,343,852 A | 8/1982 | Isaka et al. | 428/216 |
| 4,377,616 A | 3/1983 | Ashcraft et al. | 428/213 |
| 4,400,428 A | 8/1983 | Rosenthal et al. | 428/349 |
| 4,419,411 A | 12/1983 | Park | 428/516 |
| 4,502,263 A | 3/1985 | Crass et al. | 53/396 |
| 4,594,211 A | 6/1986 | Mohnhaupt | 264/141 |
| 4,632,869 A | 12/1986 | Park et al. | 428/315.5 |
| 4,652,489 A | 3/1987 | Crass et al. | 428/337 |
| 4,692,379 A | 9/1987 | Keung et al. | 428/349 |
| 4,734,317 A | 3/1988 | Bothe et al. | 428/215 |
| 4,741,950 A | 5/1988 | Liu et al. | 428/315.5 |
| 4,758,396 A | 7/1988 | Crass et al. | 264/145 |
| 4,758,462 A | 7/1988 | Park et al. | 428/213 |
| 5,176,954 A | 1/1993 | Keller et al. | 428/317.9 |
| 5,264,277 A | 11/1993 | Frognet et al. | |
| 5,397,635 A | 3/1995 | Wood, Jr. | 428/314.4 |
| 5,667,902 A | 9/1997 | Brew et al. | |
| 5,820,956 A | 10/1998 | Hatakeyama et al. | |
| 5,888,648 A | 3/1999 | Donovan et al. | 428/349 |
| 5,972,490 A | 10/1999 | Crighton et al. | 428/315.5 |
| 5,972,496 A | 10/1999 | Bader et al. | 428/331 |
| 5,981,079 A | 11/1999 | Mount, III et al. | 428/461 |
| 6,004,664 A | 12/1999 | Sasaki et al. | 428/314.2 |
| 6,013,353 A | 1/2000 | Touhsaent | 428/203 |
| 6,025,059 A | 2/2000 | McGee et al. | 428/219 |
| 6,074,762 A | 6/2000 | Cretekos et al. | 428/516 |
| 6,077,602 A | 6/2000 | Liestman et al. | 428/327 |
| 6,086,982 A | 7/2000 | Peiffer et al. | 428/213 |
| 6,087,015 A | 7/2000 | Cretekos et al. | 428/447 |
| 6,291,063 B1 * | 9/2001 | Shah et al. | 428/331 |
| 2001/0021460 A1 | 9/2001 | Kong et al. | |
| 2002/0071960 A1 | 6/2002 | Peiffer et al. | |

FOREIGN PATENT DOCUMENTS

DE  0 665 101 A1  1/1995

* cited by examiner

Primary Examiner—Robert Dawson
Assistant Examiner—Christopher Keehan
(74) Attorney, Agent, or Firm—Rick F. James

(57) ABSTRACT

A thermoplastic film comprising a core layer comprising a polyolefin wherein the core layer comprises the interior of the film; a first transition layer comprising a polyolefin and a silicone additive, wherein the first transition layer is exterior to the core layer; and a first skin layer comprising a polyolefin wherein the first skin layer is exterior to the first transition layer and the core layer.

66 Claims, 1 Drawing Sheet

METHOD FOR PREPARING SEALABLE FILMS WITH SILOXANE ADDITIVES

BACKGROUND OF THE INVENTION

This invention relates to the field of polymer films and methods for forming such films, and in particular, to a film possessing a polyolefin core layer faced on each side thereof with a transition layer containing a polydialkylsiloxane additive, and a polyolefin skin layer on the outside of each tie layer.

Heat sealable multilayer films which are useful as packaging materials are known in the art.

U.S. Pat. No. 4,343,852 describes a uniaxially or biaxially stretched composite film packaging material of from 5 to 200 microns total thickness possessing a propylene polymer base film and at least one surface film containing at least two of (a) an ethylene-propylene (EP) copolymer, (b) a propylene-alpha-olefin copolymer and (c) a copolymer of butene and any other alpha-olefin. The propylene polymer base film can contain any one of a variety of additives, e.g., a lubricating agent such as a fatty acid amide, and each surface film can contain from 0.01 to 0.15 parts by weight of a silicone oil to improve its coefficient of friction in the heated state and reduce its slide resistance caused during hot plate seal by an automatic packaging machine. Examples of silicone oils which are said to be useful for this purpose are polydimethylsiloxane, polymethylphenylsiloxane, olefin-modified silicone, polyether (e.g. polyethylene glycol, polypropylene glycol)-modified silicone, olefin/polyether-modified silicone, epoxy-modified silicone, etc. U.S. Pat. No. 4,343,852 is incorporated herein by reference in its entirety.

U.S. Pat. No. 4,400,428 describes a heat sealable, multilayer film packaging material possessing a biaxially stretched polypropylene film as the base film, an adhesion-promoting layer of modified polyolefin, a gas-barrier layer of hydrolyzed ethylene-vinyl acetate copolymer and a heat-sealing layer of olefin polymers, wherein the base film carries on at least one surface an optionally at least mono-axially oriented layer combination consisting of: (a) a heat sealable outer layer of polyethylene or of an ethylene copolymer containing at least 3%, and preferably at least 4%, by weight of ethylene; (b) an adhesion-promoting layer of modified polyolefin; (c) a gas-barrier layer of a hydrolyzed ethylene/vinyl acetate copolymer containing from 50 to 80 mole percent of vinyl acetate units of which at least 90% by hydrolyzed; (d) an adhesion-promoting layer of modified polyolefin; and, (e) a layer of polyethylene or of an ethylene copolymer containing at least 3, preferably at least 4% by weight of ethylene. Layer (a) contains an additive combination consisting of: (1) from 0.3 to 1% by weight, based on the sealable layer, of a long-chain aliphatic amine; (2) from 0.1 to 0.7% by weight, based on the sealable layer, of a dispersed thermoplastic polymer which is incompatible with the polyethylene or ethylene copolymer and which has a softening point at most 50° C. below or above the softening point of the polyethylene or ethylene copolymer; and, (3) from 0.1 to 1.2% by weight, preferably 0.2–0.7, based on the sealable layer, of a polydialkylsiloxane, preferably polydimethylsiloxane. The foregoing additive combination is said to produce a multilayer film having very good slipping properties combined with good machine processibility compared to known multilayer films containing known type lubricants such as the fatty acid amides, e.g., erucamide. U.S. Pat. No. 4,400,428 is incorporated herein by reference in its entirety.

U.S. Pat. No. 4,419,411 describes an oriented multilayer polypropylene film structure comprising coextended layers of: (a) a base layer comprising polypropylene of comparatively high stereoregularity, the precursor resin of which contains an amide of a water-insoluble monocarboxylic acid having about 8 to about 24 carbon atoms, e.g., erucamide; (b) a skin layer comprising a polyolefin of comparatively low stereoregularity on at least one surface of (a), said skin layer containing a surface-modifying proportion of a combination of finely divided silica and a silicone oil such as a 30,000 centistokes polydimethylsiloxane; the surface of skin layer (b) having bloomed thereon a surface-modifying proportion of at least some of the amide of base layer (a). U.S. Pat. No. 4,419,411 is incorporated herein by reference in its entirety.

U.S. Pat. No. 4,502,263 describes a heat sealable polyolefinic multilayer film possessing a base layer comprised of a propylene polymer and at least one sealable layer containing at least one propylene copolymer, at least one low-molecular weight resin and at least one polydiorganosiloxane, wherein the sealing layer comprises a combination of: (a) from about 68.5 to 89.7% by weight, based on the weight of the sealable layer, of an olefin resin composition comprising an ethylene-propylene-butylene terpolymer and a propylene-butylene copolymer, corresponding to a content of from about 0.1 to 7% by weight of ethylene, 53 to 89.9% by weight of propylene and 10 to 40% by weight of butylene, based on the weight of the olefin resin composition; (b) from about 5 to 15% by weight, based on the weight of the sealable layer, of a low-molecular weight resin, which is compatible with the olefin resin composition; (c) from about 5 to 15% by weight, based on the weight of the sealable layer, of a propylene homopolymer; and (d) from about 0.3 to 1.5% by weight, based on the weight of the sealable layer, of a polydiorganosiloxane such as any of those referred to above. U.S. Pat. No. 4,502,263 is incorporated herein by reference in its entirety.

U.S. Pat. No. 4,692,379 describes an oriented, heat sealable polymer film laminate possessing a low coefficient of friction, good receptivity for water-based coatings and good optical clarity and a method for manufacturing. U.S. Pat. No. 4,692,379 is incorporated herein by reference in its entirety.

U.S. Pat. No. 4,734,317 describes a polyolefin film having a base layer composed essentially of propylene polymers and having sealing layers present on both sides, composed essentially of sealable olefin polymers. Polydialkylsiloxane is incorporated in a first of the two sealing layers, and this layer is not subjected to corona treatment. The second sealing layer is subjected to corona treatment and has polydialkylsiloxane, not incorporated, but present on its outer surface, the polydialkylsiloxane having been transferred to this layer by contact with the sealing layer in which polydialkylsiloxane is incorporated. The relative polydialkylsiloxane occupancy on the second layer, which is determined by means of ESCA spectroscopy, is not more than 15. The three-layer polyolefin film is prepared by a coextrusion process. It is particularly suitable for use as a packaging film on high-speed packaging machines. U.S. Pat. No. 4,734,317 is incorporated herein by reference in its entirety.

U.S. Pat. No. 6,087,015 describes a thermoplastic film having a matte surface comprising: a core layer of a thermoplastic polymer, the core layer having a first side and a second side, and a matte surface layer on a first side of the core layer, the matte surface layer comprising a blend of (i) a copolymer of ethylene and propylene or a terpolymer of ethylene, propylene and a C4 to C10 alpha-olefin or a propylene homopolymer; (ii) an ethylene polymer and (iii) a polydialkylsiloxane selected from the group consisting of (1) a polydialkylsiloxane having a number average molecular weight above about 250,000, typically above about 300,000 and a viscosity of above about 10,000,000 cSt, usually ranging from about 15,000,000 to about 20,000,000 cSt., and (2) a polydialkylsiloxane functionalized polyolefin. The external surface of the matte surface layer demonstrates a coefficient of friction ranging from about 0.1 to about 0.85 as determined by ASTM D1894 with an 18.14 kg (4 lb.) pound sled. U.S. Pat. No. 6,087,015 is incorporated herein by reference in its entirety. U.S. Pat. No. 6,087,015 is incorporated herein by reference in its entirety.

U.S. Pat. No. 6,086,982 describes a biaxially oriented polypropylene film. The n-heptane-insoluble content of the film has a chain isotactic index, measured by <13> C-NMR spectroscopy, of at least 97%. In addition, a process for the production of the polypropylene film and the use of the film are described. U.S. Pat. No. 6,086,982 is incorporated herein by reference in its entirety.

U.S. Pat. No. 6,074,762 describes a block-resistant film which comprises a core layer of a thermoplastic polymer having a first side and a second side; a functional layer which is printable or sealable or treatable for printing or sealing is on the first side of the core layer, and a block-resistant layer is on the second side of the core layer. The block-resistant layer comprises a thermoplastic polymer and an amount of a polydialkylsiloxane, based upon the entire weight of the block-resistant layer, sufficient to inhibit blocking of the block-resistant layer to the functional layer when they are in contact and which polydialkylsiloxane deposits silicon onto the functional layer but the amount of silicon deposited is not substantially detrimental to the printing function or the sealing function. U.S. Pat. No. 6,074,762 is incorporated herein by reference in its entirety.

SUMMARY OF THE INVENTION

In accordance with the present invention, there is provided a polymer film possessing a low coefficient of friction, which comprises:

(a) a core layer comprising a polyolefin wherein the core layer comprises the interior of the film;

(b) a first transition layer comprising a polyolefin and a silicone additive, wherein the first transition layer is exterior to the core layer; and (c) a first skin layer comprising a polyolefin wherein the first skin layer is exterior to the first transition layer, and wherein the first skin layer is exterior to the core layer.

The advantages of the present invention include one or more of the following:

A film which can be sealed on both sides.

A film which can be treated on both sides.

A film which is composed of multiple layers.

A film which has high scratch resistance.

A film which has good slip properties

A film which is transparent

A film which has good printability

A film which has decreased coefficient of friction

A film which has decreased hot slip

A two-side treated, two-side sealable film using a silicon oil slip package

A film without loss of sealability after treatment

For a better understanding of the present invention, together with other and further objects, reference is made to the following description, taken together with the accompanying drawings, and its scope will be pointed out in the appended claims.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of several illustrative embodiments when read in conjunction with the accompanying drawings, wherein:

DETAILED DESCRIPTION OF THE DRAWINGS

Figure 1:
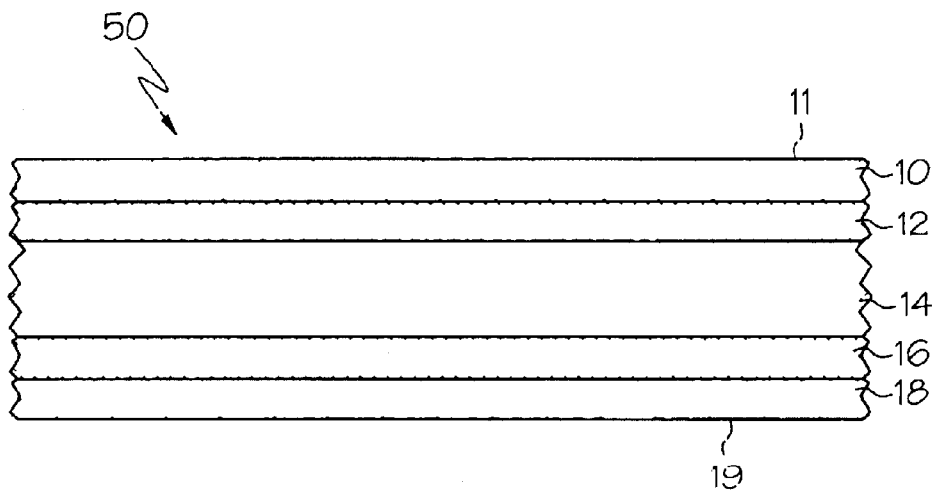
FIG. 1 is a cross sectional view of a five layered film.

Referring now to FIG. 1 is a cross sectional view of a five layered film 50. The film 50 is comprised of a first surface 11, a first skin layer 10, a first intermediate or transition layer 12, a core layer 14, a second intermediate or transition layer 16, a second skin layer 18, and a second surface 19.

In one embodiment of a five layered film 50, the first transition layer 12 comprises a polydialkylsiloxane additive.

In a second embodiment, the first transition layer 12 comprises a polydialkylsiloxane additive as in the first embodiment, and the second transition layer 16 comprises a polydialkylsiloxane additive as in the first embodiment.

In a third embodiment of a five layered film 50, the first surface 11 of the first skin layer 10 is treated and the first transition layer 12 comprises a polydialkylsiloxane additive. Possible treatments for the first surface 11 include corona discharge, flame, and plasma treatment.

In a fourth embodiment of a five layered film 50, the first surface 11 of the first skin layer 10 is treated and the first transition layer 12 comprises a polydialkylsiloxane additive as in the third embodiment, and the second surface 19 of the second skin layer 18 is treated and the second transition layer 16 comprises a polydialkylsiloxane additive. Possible treatments for the first surface 11 include corona discharge, flame, and plasma treatment.

Figure 2:
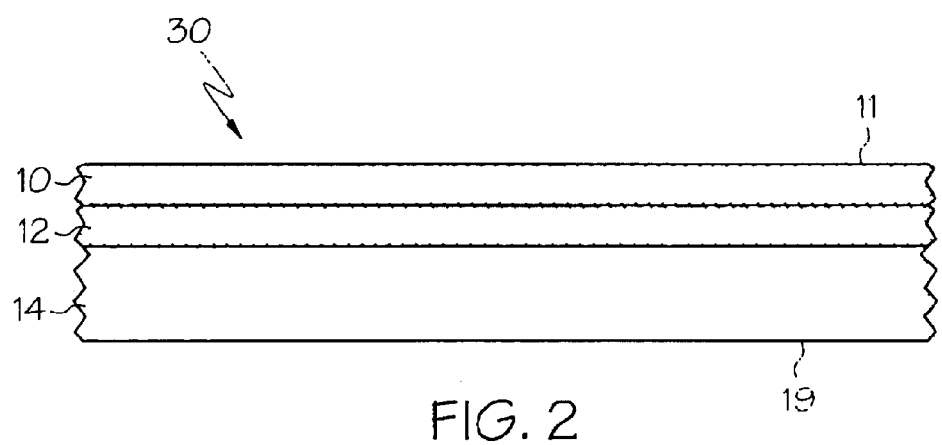
FIG. 2 is a cross sectional view of a three layered film.

Referring now to FIG. 2 is a cross sectional view of a three layered film 30. The film 30 is comprised of a first surface 11, a first skin layer 10, a first transition layer 12, a core layer 14, and a second surface 19.

In one embodiment of a three layered film 30, the first transition layer 12 comprises a polydialkylsiloxane additive.

In a second embodiment of a three layered film 30, the first surface 11 of the first skin layer 10 is treated and the first transition layer 12 comprises a polydialkylsiloxane additive. Possible treatments for the first surface 11 include corona discharge, flame, and plasma treatment.

Figure 3:
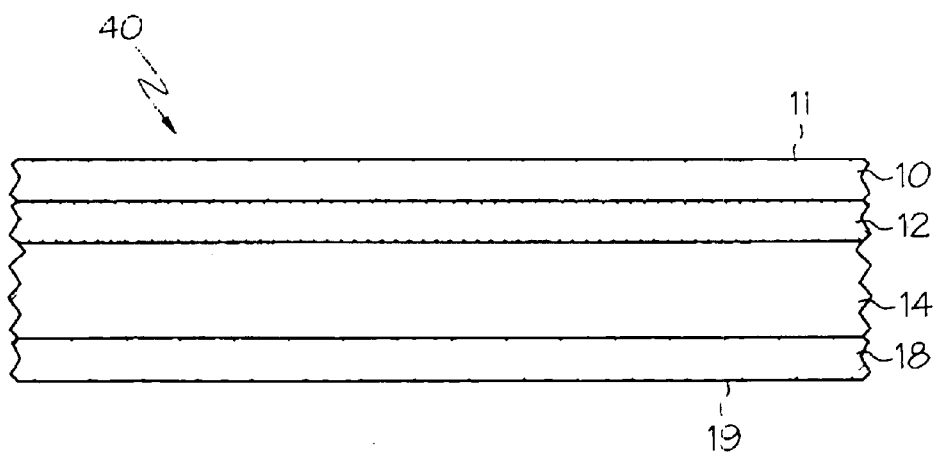
FIG. 3 is a cross sectional view of a four layered film.

Referring now to FIG. 3 is a cross sectional view of a four layered film 40. The film 40 is comprised of a first surface 11, a first skin layer 10, a first transition layer 12, a core layer 14, a second skin layer 18, and a second surface 19.

In one embodiment of a four layered film 40, the first transition layer 12 comprises a polydialkylsiloxane additive.

In a second embodiment of a four layered film 40, the first surface 11 of the first skin layer 10 is treated and the first transition layer 12 comprises a polydialkylsiloxane additive. Possible treatments for the first surface 11 include corona discharge, flame, and plasma treatment.

In another embodiment, to aid in providing the film with low light transmission, especially in the UV and blue wavelengths, iron oxide is added to the core layer 14 in an amount of from about 1 to about 8% by weight, or in another embodiment about 2% to 4% by weight. Carbon black or other compounds may also be used. In another embodiment, aluminum is also added in an amount of from about 0 to about 1.0% by weight, in another embodiment from about 0.25% to about 0.75% by weight, and in another embodiment about 0.5% by weight. In another embodiment, the core layer 14 also contains from about 0.5% by weight to about 3% by weight of $TiO_2$ and/or talc.

In one embodiment, from about 3% to about 9% by weight of inorganic particulate material such as $TiO_2$ and/or talc is added to the melt mixture of the core layer 14 before extrusion.

In one embodiment, when forming the core layer 14, as in U.S. Pat. Nos. 4,377,616; 4,632,869; 5,176,954; 5,397,635; 5,972,490; 4,758,396; 4,758,462; 4,652,489; 4,741,950; 4,594,211; and 6,004,664 the disclosures of which are incorporated herein by reference in their entirety, a master batch technique can be employed by either forming the void initiating particles in situ or in adding preformed spheres to a molten thermoplastic matrix material. After the formation of a master batch, appropriate dilution of the system can be made by adding additional thermoplastic matrix material until the desired proportions are obtained. However, the components may also be directly mixed and extruded instead of utilizing a master batch method. The void-initiating particles which are added as filler to the polymer matrix material of the core layer 14 can be any suitable organic or inorganic material which is incompatible with the core material at the temperature of biaxial orientation such as polybutylene terephthalate, nylon, solid or hollow preformed glass spheres, metal beads or spheres, ceramic spheres, calcium carbonate, COC's (cyclic olefin polymers and cyclic olefin copolymers), etc.

In one embodiment, the core layer may contain microscopic voids and/or from about 1% to about 15%, or from about 1% to about 8%, or from about 2% to about 4% (by weight) of an opacifying agent, selected from the group consisting of iron oxide, carbon black, aluminum, TiO2, talc, or combinations thereof.

In another embodiment, void-initiating particles may be added as filler to the polymer matrix material of the core layer which comprise any suitable organic or inorganic material which is incompatible with the core material at the temperature of biaxial orientation, such as polybutene teraphthalate (PBT), nylon, solid or hollow preformed glass spheres, metal beads or spheres, ceramic spheres, calcium carbonate, or combinations thereof. The average diameter of the void-initiating particles may be from 0.1 to 10 $\mu$m. These particles may be of any desired shape or they may be substantially spherical in shape. This does not mean that every void is the same size. It means generally each void tends to be of like shape when like particles are used even though they vary in dimensions. These voids may assume a shape defined by two opposed and edge contacting concave disks. These void initiating particles will be present in the core layer at less than about 30%, or less than about 20%, or or less than about 10%, or in the range from about 2% to about 10% (by weight, based on the total weight of the core layer.) In one embodiment, the two average major void dimensions are greater than about 30 microns. The void-initiating particle material, as indicated above, may be incompatible with the core material, at least at the temperature of biaxial orientation.

The core has been described above as being a thermoplastic polymer matrix material within which is located a strata of voids. The voids create the matrix configuration. The term "strata" is intended to convey that there are many voids creating the matrix and the voids themselves may be oriented so that the two major dimensions are aligned in correspondence with the direction of orientation of the polymeric film structure. As described herein above, iron oxide in an amount of from about 1% to about 8%, or from about 2% to about 4% (by weight), and aluminum in an amount up to about 1.0%, or from about 0.25% to about 0.85% (by weight) may be added to the core matrix. Carbon black may also be used in lieu of some or all of the iron oxide.

A typical void of the core is defined as having major dimensions X and Y and minor dimensions Z, where dimension X is aligned with machine direction orientation, dimension Y is aligned with transverse direction orientation and dimension Z approximately corresponds to the cross-sectional dimension of the spherical particle which initiated the void. Orientation conditions may be such that the X and Y dimensions of the voids of the core by major dimensions in comparison to the Z dimension. Thus, while the Z dimension generally approximates the cross-sectional dimension of the spherical particle initiating the void, X and Y dimensions may be significantly greater.

Polypropylene may be oriented at a temperature higher than its glass transition temperature. The temperature conditions may permit X and Y to be at least several multiples of the Z dimension, without void splitting. As indicated above, the matrix polymer and the void initiating particle may be incompatible and this term is used in the sense that the materials are two distinct phases. The spherical void initiating particles constitute a dispersed phase throughout the lower melting polymer which polymer will, ultimately, upon orientation, become a void-filled matrix with the spherical particles positioned somewhere in the voids.

In another embodiment, the core layer 14 may contain hydrocarbon wax. The wax used is typically a hydrocarbon wax, which may be either a mineral wax or a synthetic wax. Polyethylene type wax may have an average chain length between 22 and 65 carbon atoms, or between 22 and 40 carbon atoms, a molecular weight between 300 and 800, and a melting point between about 125° F. and 190° F. (52° C. and 88° C.). Suitable waxes include paraffin waxes, microcrystalline waxes, and intermediate waxes having a molecular weight between about 300 and 450, and a melting point between about 125° F. and 160° F. (52° C. and 71° C.). The paraffin wax typically include a mixture of normal and branched paraffins, with the normal paraffin content generally being from 35 to 90 percent by weight. The paraffin wax typically has a broad molecular weight distribution. For example, each fraction of chains containing a certain number of carbon atoms represents less than 25 percent, or less than 20 percent, of the wax. A paraffin wax having a broad molecular weight distribution provides better barrier properties than a paraffin wax having a narrow molecular weight distribution. A suitable wax is Chevron 143. It has a melting point of 143° F. (62° C.), an average chain length of 29 carbon atoms, an average molecular weight of 416, a normal paraffin content of 74 percent, and contains 12 percent C 28 fraction, 12 percent C 29 fraction, and 11 percent C 30 fraction (the three largest fractions in the wax). In one embodiment, the core layer may contains at least about 2.5 wt % wax, or at least about 5 wt % wax, at least about 7.5 wt % wax, at least about 10 wt % wax, or at least about 12 wt % wax, or at least about 15 wt % wax, based on the total weight of the core layer.

In another embodiment, the core layer 14 may contain a hydrocarbon resin. Examples of such hydrocarbon resins may be found in U.S. Pat. No. 5,667,902, incorporated herein by reference in its entirety. The resin may be a low molecular weight hydrocarbon which is compatible with the core polymer. The resin may, optionally, be hydrogenated. The resin may have a number average molecular weight of less than about 5000, or of less than about 2000, or from about 500 to about 1000. The resin can be natural or synthetic and may have a softening point in the range of from about 60° to about 180° C. Examples of suitable hydrocarbon resins include petroleum resins, terpene resins, styrene resins, and cyclopentadiene resins. Examples of commercially available hydrogenated resins are those including Piccolyte®, Regalrez®, Regalite®, available from Hercules Corp., and Escorez®, available from ExxonMobil Chemical Co. One particular resin may be referred to as a saturated alicyclic resin. Such resins, if used, may have a softening point in the range of from 85–140° C., or 100°–140° C., as measured by the ring and ball technique. Examples of commercially available saturated alicyclic resins are Arkon-P®, available from Arakawa Forest Chemical Industries, Ltd., of Japan. The core layer may contain up to about 15%, or up to about 10% (by weight) of any of such resins described above, singly or in any combination or in the range of from about 2% to about 10% (by weight), or in another embodiment from about 1% to about 5% (by weight), or from about 6% to about 12% (by weight.) Additionally, the core layer 14 may contain more than one of the additives discussed above.

The polyolefins contemplated as the material in the core layer 14 include polypropylene, polyethylene, polybutene and copolymers and blends thereof. One embodiment uses an isotactic polypropylene containing at least about 80% by weight of isotactic polypropylene, wherein it is preferred that the polypropylene have a melt flow index of from about 2 to 10 g/10 min. Another embodiment uses a high density polyethylene, with a density of 0.95 or greater. Another embodiment uses a linear low density polyethylene.

In one embodiment, the core layer 14 is derived from a polypropylene of high stereoregularity and in general may chosen from among the highly isotactic polypropylenes. The polypropylenes for this embodiment are well known in the art and are formed by polymerizing polypropylene in the presence of stereospecific catalyst systems. The polypropylenes can have a melt index at 230° C. ranging from about 1.0 to about 25.0. The crystalline melting point is about 160° C. The number average molecular weight ranges from about 25,000–100,000 and density ranges from about 0.90 to 0.91.

The polyolefins contemplated as the material in the first skin layer 10 and/or second skin layer 18 are selected from the group consisting of EP random copolymer, PB copolymer, EPB terpolymer, MDPE, LLDPE, LDPE, EVA, EMA, surlyn ionomer, EVOH copolymer, amorphous polyamide, and blends thereof.

The first skin layer 10 and/or the second skin layer 18 may be heat sealable or non heat sealable. In one embodiment, if the first skin layer 10 and/or the second skin layer 18 are not heat sealable, then a heat sealable coating layer (not shown) may be applied to the first skin layer 10 and/or the second skin layer 18. A heat sealable coating layer (not shown) may be, for example, vinylidene chloride polymer or an acrylic polymer. Vinylidene chloride polymer or acrylic polymer coating may also be applied to the exposed first surface 11 or second surface 19.

In another embodiment, if the first skin layer 10 and/or the second skin layer 18 are heat sealable, it can be fabricated from any of the heat sealable copolymers, blends of homopolymers and blends of copolymer(s) and homopolymer(s) heretofore employed for this purpose. Illustrative of heat sealable copolymers which can be used for the first skin layer 10 and/or the second skin layer 18 of the present film are ethylene-propylene copolymers containing from about 1.5 to about 10, and preferably from about 3 to about 5 weight percent ethylene and ethylene-propylene-butene terpolymers containing from about 1 to about 10, and preferably from about 2 to about 6 weight percent ethylene and from about 80 to about 97, and preferably from about 88 to about 95 weight percent propylene. In another embodiment, heat sealable blends of homopolymer can be utilized for the first skin layer 10 and/or the second skin layer 18 which include from about 1 to about 99 weight percent polypropylene homopolymer, e.g., one which is the same as, or different from, the polypropylene homopolymer constituting core layer 14 blended with from about 99 to about 1 weight percent of a linear low density polyethylene (LDPE). If the first skin layer 10 and/or the second skin layer 18 are heat-sealable, corona, plasma, or flame treatment of that layer is optional.

In another embodiment, heat sealable blends of copolymer(s) and homopolymer(s) which may be used for the first skin layer 10 and/or the second skin layer 18 include: a blend of from about 5 to about 19 weight percent of polybutylene and from about 95 to about 81 weight percent of a copolymer of propylene (80 to about 95 mole percent) and butylene (20 to about 5 mole percent); a blend of from about 10 to about 90 weight percent of polybutylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent polybutylene and from about 90 to about 10 weight percent of a copolymer of ethylene (10 to about 97 mole percent) and propylene (90 to about 3 mole percent); and, a blend of from about 90 to about 10 weight percent of polybutylene, and from about 10 to about 90 weight percent of a copolymer of propylene (2 to about 79 mole percent) and butylene (98 to about 21 mole percent).

In one embodiment, the thickness of the first skin layer 10 and the second skin layer 18 is less than about 2 microns. In another embodiment, the thickness of the first skin layer 10 and the second skin layer 18 is less than about 1 micron. In a third embodiment, the thickness of the first skin layer 10 and the second skin layer 18 is less than about 0.5 microns.

The first skin layer 10 and the second skin layer 18 may be compounded with an anti-blocking effective amount of an anti-blocking agent, e.g., silica, clays, talc, glass, polymethylsilosiloxane, cross-linked methacrylate, and the like, which may be provided in the form of approximately spheroidal particles. The major proportion of these particles, for example, anywhere from more than half to as high as 90 weight percent or more, may be of such a size that a significant portion of their surface area, for example, from about 10 to about 70 percent thereof, will extend beyond the exposed first surface 11 or second surface 19.

The first skin layer 10 and/or the second skin layer 18 can also contain pigments, fillers, stabilizers, light protective agents or other suitable modifying ingredients if desired.

The polyolefin contemplated as the material in the first transition layer 12 and second transition layer 16 is selected from the group consisting of PP homopolymer, EP block copolymer, EP random copolymer, PB copolymer, EPB terpolymer, MDPE, LLDPE, LDPE, EVA, EMA, surlyn ionomer, maleic anhydride grafted polyolefins, and blends thereof.

The contemplated polyolefins which may be used for the first transition layer 12 and second transition layer 16 are comparatively low crystallinity or low stereoregularity polymers. The polyolefins can have a melt flow rate at 446 degrees F. ranging from about 2 to about 15 grams per 10 minutes, and in another embodiment from about 4 to about 9 grams per 10 minutes. The crystalline melting point can range from about less than 180 degrees F. to somewhat greater than 280 degrees F. The terpolymers will predominate in propylene, and the ethylene and 1-butene monomers can be present in approximately from 0.1:1–1:1 mole percentage in relation to each other. In one embodiment a random copolymer can be used. In another embodiment an ethylene-propylene impact copolymer or block copolymer can be used.

In another embodiment, the first transition layer 12 and/or the second transition layer 16 may be compounded with a silicone additive, either silicone oil or silicone gum. In one embodiment, the silicone additive may possess a viscosity of from about 350 to about 100,000 centistokes. In another embodiment, the silicone additive has a viscosity from about 10,000 to about 30,000 centistokes. Examples of suitable silicone additives are polydialkylsiloxanes, polyalkylphenylsiloxanes, olefin-modified siloxane oils, polyether-modified silicone oils, olefin/-polyether-modified silicone oils, epoxy-modified silicone oils and alcohol-modified silicone oils, polydialkylsiloxanes which may have from about 1 to about 4 carbon atoms in the alkyl group, in particular polydimethyl-siloxanes.

The silicone additive may be added to the first transition layer 12 and/or the second transition layer 16 generally in the form of a dispersion or emulsion, the silicone being present within this layer as discrete microglobules, frequently of an average size of from about 1 to about 2 microns. The silicone additive, which is generally substantially uniformly distributed throughout the first transition layer 12 and/or the second transition layer 16 migrates through the the first skin layer 10 and/or the second skin layer 18 to impart a reduced coefficient of friction to the first surface 11 and/or second surface 19.

The silicone additive may be incorporated homogeneously in the the first transition layer 12 and the second transition layer 16. This can be achieved by either incorporating the silicone additive as a dispersion or emulsion at room temperature and then heating the blend with the application of shearing forces or by incorporating the additive while the blend is being melted. The mixing temperature must be high enough to soften the blend and enable a very uniform mixture to be formed. The temperature required in a kneader or extruder is generally from about 170° to about 270° C.

In one embodiment, the silicone additive in the first transition layer 12 and/or the second transition layer 16 comprises a polydialkylsiloxane additive. In another embodiment, the first transition layer 12 and/or the second transition layer 16 comprises up to about 4 percent by weight of the polydialkylsiloxane additive. In another embodiment, the first transition layer 12 and/or the second transition layer 16 comprises up to about 2 percent by weight of the polydialkylsiloxane additive. In another embodiment, the first transition layer 12 and/or the second transition layer 16 comprises from about 0.6 percent by weight to about 2 percent by weight of the polydialkylsiloxane additive.

In one embodiment, the polydialkylsiloxane additive has a viscosity from about 1,000 to about 100,000 centistokes. In another embodiment, the polydialkylsiloxane additive has a viscosity above about 1,000,000 centistokes. In another embodiment, the polydialkylsiloxane additive has a viscosity between about 10,000,000 and 50,000,000 centistokes.

Suitable EPB terpolymers for the first skin layer 10, the first transition layer 12, the second transition layer 16, and the second skin layer 18 may be obtained from the random interpolymerization of from about 1 to about 8 weight percent ethylene, preferably from about 3 to about 6 weight percent ethylene with from about 65 to about 95 weight percent propylene, preferably from about 86 to about 93 weight percent propylene, butene-1 representing the balance. The foregoing EPB terpolymers are for the most part characterized by a melt index at 230° C. of from about 2 to about 16 and advantageously from about 3 to about 7, a crystalline melting point of from about 100° C. to about 120° C., an average molecular weight of from about 25,000 to about 100,000 and a density within the range of from about 0.89 to about 0.92 gm/cm$^3$.

The EP random copolymers for the first skin layer 10, the first transition layer 12, the second transition layer 16, and the second skin layer 18 may contain from about 2 to about 7 weight percent ethylene, the balance being made up of propylene. The copolymers can have a melt index at 230° C. generally ranging from about 2 to about 15 and preferably from about 3 to about 8. The crystalline melting point is usually from about 125° C. to about 150° C. and the number average molecular weight range is from about 25,000 to 100,000. The density will usually range from about 0.89 to about 0.92 gm/cm$^3$. In general, where blends of EPB terpolymer and EP random copolymer are used, said blends may contain from about 10 to about 90 weight percent EPB terpolymer and preferably from about 40 to about 60 weight percent EPB terpolymer, the balance being made up of EP random copolymer.

In one embodiment, the exposed first surface 11 and/or second surface 19 are treated in a known and conventional manner, e.g., by corona discharge to improve its receptivity to inks and/or its suitability for such subsequent manufacturing operations as lamination.

In one embodiment, the exposed treated or untreated first surface 11 and/or second surface 19 have applied to it, coating compositions or substrates such as another polymer film or laminate; a metal foil such as aluminum foil; cellulosic webs, e.g. numerous varieties of paper such as corrugated paperboard, craft paper, glassine, cartonboard; nonwoven tissue, e.g., spunbonded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like.

In a preferred embodiment, the film of the present invention is extrusion laminated to another polyolefin film.

In one embodiment, the first skin layer 10, first transition layer 12, core layer 14, second transition layer 16, and second skin layer 18 are coextruded. Thereafter, the film is preferably biaxially oriented. For example, when employing polypropylene for the core matrix and the skin layers and employing PBT as the void initiating particles, a machine direction orientation is preferably from about 4 to about 8 and a transverse orientation is preferably from 4 to about 10 times at a drawing temperature of about 100 degrees C. to 170 degrees C. to yield a biaxially oriented film. A preferred film thickness is from about 0.5 mil to about 3.5 mils.

In another embodiment the first skin layer 10 and/or the second skin layer 18 has a coating or metal layer applied.

U.S. Pat. Nos. 6,077,602; 6,013,353; 5,981,079; 5,972,496; 6,074,762; 6,025,059; and 5,888,648 disclose the use of coatings and/or metal layers on a film, and are disclosed herein by reference. In one embodiment, suitable coatings may include PVdC's, PVOH's, or acrylics which serve to boost gloss, enhance machineability, and/or enhance ink adhesion; suitable metals may include aluminum. In another embodiment, the first skin layer 10 and/or the second skin layer 18 may have an aluminum layer applied by a vacuum deposit process.

Although certain preferred embodiments have been disclosed for the five layer film 50, three layer film 30, and four layer film 40, additional embodiments of films with three or more layers are possible by interchanging elements already disclosed that would be clear to one with ordinary skill in the art.

The following examples illustrate the present invention:

EXAMPLE 1

An example of a typical 4 or 5-layer heat sealable coextruded structure exhibiting this concept with some representative polyolefins for the tie layers and skin or cap layers is shown below.

---
Treated or Untreated
---
EP random copolymer, PB copolymer, EPB terpolymer, MDPE, LLDPE, LDPE, EVA, EMA, Surlyn ionomer (0.1–2.0 micron thickness)

PP homopolymer, EP block copolymer, EP random copolymer, PB copolymer, EPB terpolymer, MDPE, LLDPE, LDPE, EVA, EMA, Surlyn ionomer containing 0.2–4% polydialkylsiloxane additive (0.2–6.0 micron thickness)

Isotactic PP homopolymer, HDPE or LLDPE (5–50 micron thickness)

Optional Second Tie Layer - PP homopolymer, EP block copolymer, EP random copolymer, PB copolymer, EPB terpolymer, MDPE, LLDPE, LDPE, EVA, EMA, Surlyn ionomer, maleic andhydride grafted polyolefin containing 0.2–4% polydialkylsiloxane additive (0.2–6.0 micron thickness)

EP random copolymer, PB copolymer, EPB terpolymer, MDPE, LLDPE, LDPE, EVA, EMA, Surlyn ionomer, EVOH copolymer (0.1–2.0 micron thickness)

---
Treated or Untreated
---

EXAMPLE 2
Two Side Sealable Coextruded Type Structures 5-layer two side sealable film structures (21 microns) were produced with siloxane type additives in both tie layers. The layer structure was as follows:

---
Outside - Untreated
---
Chisso XPM7510 EPB terpolymer (0.15–0.60 micron thickness)
Chisso XPM7500 Series EPB terpolymer w/polydimethylsiloxane additive (0.5 microns)
Isotactic PP homopolymer (18.5–19.5 micron thickness)
Chisso XPM7500 Series EPB terpolymer w/polydimethylsiloxane additive (0.5 microns)
Chisso XPM7510 EPB terpolymer (0.15–0.60 micron thickness)

---
Inside - Corona Treated
---

Three types of siloxane additives were trialed: 1. Dow Corning 10,000 cs silicone oil, 2. Dow Corning 60,000 cs silicone oil, 3. Dow Corning MB50-001 silicone gum masterbatch (50% ultra high molecular weight siloxane in PP homopolymer). Two control films were produced for comparison purposes. One control film (BW-01270-01) was a 3-layer film with 30,000 cs silicone oil in each skin layer. One side was treated to exhibit the loss of sealability when a surface with silicone oil is treated. A second control (BW-01270-03) film was produced with no siloxane additive in neither the skin layer nor the tie layer to exhibit the high cof numbers obtained when siloxane is not used as an additive in the film.

Films were tested for crimp seal strength (230–280F), TMI static and kinetic cof, and optical properties (haze and gloss). Lab test data is shown in the table below. With all three types of siloxane additive in the tie layer, it was possible to produce a surface treated two side sealable film that exhibited improved cof relative to the control film without siloxane additive. The ultrahigh molecular weight silicone gum was found to be the most effective of the 3 siloxane additives for maintaining sealability and improving slip properties. The use of silicone gum also allows for thinner skin layers to be used without sealability loss after surface treatment. For all films, the treated surface has a higher cof than the untreated surface probably due to static charges induced with corona treatment.

| SILOXANE IN TIE LAYER LAB TEST RESULTS | | | | | |
|---|---|---|---|---|---|
| Semiworks Roll # | BW-01270-01 | BW-10270-03 | BW-10270-09 | CW-01310-07 | CW-01310-12 |
| Skin Resin | XPM7504 | XPM7510 | XPM7510 | XPM7510 | XPM7510 |
| Skin Siloxane Additive | 30K cs Si oil | None | None | none | None |
| Skin Additive level | 0.8% | Not applicable | not applicable | not applicable | Not applicable |
| Skin thickness (microns) | 0.58 | 0.15 | 0.15 | 0.61 | 0.46 |
| Tie Layer base resin | PP homo. | XPM7510 | XPM7510 | XPM7510 | XPM7510 |
| Tie Layer Siloxane Additive | None | None | Si Gum | 10K cs Si oil | 60K cs Si Oil |
| Tie Layer Additive Level | not applicable | Not applicable | 1.50% | 1% | 1% |
| Tie Layer Thickness (micron) | Same as core | 0.5 | 0.5 | 0.5 | 0.5 |
| Corona treatment (Outside - o) | No | No | no | no | No |
| Corona treatment (Inside - I) | Yes | Yes | yes | yes | Yes |
| Crimp Seal Strength (g/in) (o/o) | 385 | 390 | 410 | 340 | 340 |
| Crimp Seal Strength (g/in) (I/I) | 45 | 395 | 515 | 240 | 245 |
| Static cof (o/o) | 0.3 | 0.69 | 0.24 | 0.28 | 0.27 |
| Kinetic cof (o/o) | 0.29 | 0.68 | 0.23 | 0.27 | 0.27 |
| Static cof (I/I) | 0.55 | 0.9 | 0.39 | 0.59 | 0.62 |
| Kinetic cof (I/I) | 0.52 | 0.9 | 0.38 | 0.61 | 0.63 |
| Haze % | 1.3 | 1.1 | 1.9 | 1.7 | 1.5 |
| Gloss | 88.7 | 91.9 | 88.5 | 88.4 | 88.7 |

What is claimed is:

1. A thermoplastic film comprising:
   (a) a core layer comprising a Ziegler-Natta catalyst-polymerized polypropylene, polyethylene, polybutene, copolymers thereof or blends thereof wherein the core layer comprises the interior of the film;
   (b) a first transition layer comprising a polyolefin and a silicone additive, wherein the first transition layer is exterior to the core layer; and
   (c) a first skin layer comprising a polyolefin wherein the first skin layer is exterior to the first transition layer and the core layer;
   wherein the first transition layer is between the core layer and the first skin layer.

2. The film of claim 1 wherein the first skin layer has an exposed surface and wherein the exposed surface of the first skin layer is subjected to a treatment selected from the group consisting of corona discharge, plasma, and flame.

3. The film of claim 1 in which the silicone additive of the first transition layer is a polydialkylsiloxane.

4. The film of claim 1 in which the silicone additive of the first transition layer is a polydimethylsiloxane.

5. The film of claim 1 in which a sufficient amount of silicone additive is incorporated in the first transition layer as to migrate through the first skin layer to an exposed surfaces of the first skin layer to confer a coefficient of friction of less than about 0.7.

6. The film of claim 1 in which a sufficient amount of silicone additive is incorporated in the first transition layer as to migrate through the first skin layer to an exposed surfaces of the first skin layer to confer a coefficient of friction from about 0.2 to about 0.5.

7. The film of claim 1 wherein the first skin layer further comprises an anti-blocking agent and wherein at least a major proportion of the anti-blocking agent is in the form of particles of approximately spherical shape.

8. The film of claim 7 wherein the anti-blocking agent is selected from the group consisting of silica, cross-linked methacrylate, and polymethylsilosiloxane.

9. The film of claim 7 wherein the anti-blocking agent is silica particles wherein at least a major proportion of which are approximately spherical in shape.

10. The film of claim 1 wherein the first skin layer comprises a polymer selected from the group consisting of ethylene-propylene-butene-1 terpolymer, ethylene-propylene random copolymer, propylene-butene-1 copolymer, MDPE, LLDPE, LDPE, EVA, EMA, surlyn ionomer, and mixtures thereof.

11. The film of claim 10 wherein the ethylene-propylene-butene-1 terpolymer component comprises from about 10 to about 90 weight percent of the blend and the ethylene-propylene random copolymer comprises from about 10 to about 90 weight percent of the blend.

12. The film of claim 10 in which the ethylene-propylene-butene-1 terpolymer is obtained from the random interpolymerization of from about 1 to about 8 weight percent ethylene with from about 65 to 95 propylene with butene-1 making up the balance of the terpolymer.

13. The film of claim 10 in which the ethylene-propylene-butene-1 terpolymer is obtained from the random interpolymerization of from about 3 to about 6 weight percent ethylene with from about 86 to about 93 weight percent propylene with butene-1 making up the balance of the terpolymer.

14. The film of claim 10 in which the ethylene-propylene random copolymer is obtained from the random co-polymerization of from about 2 to about 8 weight percent ethylene with propylene making up the balance of the copolymer.

15. The film of claim 10 in which the propylene-butene-1 copolymer is obtained from the random co-polymerization of from about 1 to about 16 weight percent butene-1 with propylene making up the balance of the copolymer.

16. The film of claim 1 wherein the core layer comprises a polymer selected from the group consisting of a polypropylene homopolymer, a high-density polyethylene, a linear low-density polyethylene, a ethylene-propylene copolymer, and mixtures thereof.

17. The film of claim 1 wherein the transition layer comprises a polymer selected from the group consisting of polypropylene homopolymer, medium-density polyethylene, linear low-density polyethylene, low-density polyethylene, ethylene-propylene copolymer, propylene-butene copolymer, ethylene-propylene-butene terpolymer, EVA, EMA, surlyn ionomer, and mixtures thereof.

18. The film of claim 1 in which the core layer comprises at least about 70 percent of the total thickness of the film.

19. The film of claim 18 in which the total thickness of the film is from about 0.35 to about 2.0 mils.

20. The film of claim 1 wherein the first transition layer has a thickness of about 0.2 to about 6 microns and wherein the first skin layer has a thickness of about 0.1 to about 3 microns.

21. The film of claim 1 wherein the silicone additive has a viscosity greater than about 1,000,000 centistokes.

22. The film of claim 1 wherein the silicone additive has a viscosity from about 10,000,000 centistokes to about 50,000,000 centistokes.

23. The film of claim 1 wherein the silicone additive has a viscosity greater than about 1,000 centistokes.

24. The film of claim 1 wherein the first transition layer comprises from about 0.2% to about 4% by weight of the silicone additive.

25. The film of claim 1 wherein the first transition layer comprises from about 0.6% to about 2% by weight of the silicone additive.

26. The film of claim 1 wherein the first transition layer comprises from about 0.6% to about 2% by weight of the silicone additive, and wherein the silicone additive has a viscosity from about 10,000,000 centistokes to about 50,000,000 centistokes.

27. The film of claim 1 wherein the exterior side of the first skin layer is coated with a coating selected from the group consisting of acrylics, PVDC, PVOH, and mixtures thereof.

28. The film of claim 1 wherein the exterior side of the first skin layer is vacuum metallized.

29. The film of claim 1 having a seal strength of at least about 200 grams per inch and having a coefficient of friction of at most about 0.65.

30. The film of claim 1 having a seal strength of at least about 240 grams per inch and having a coefficient of friction of at most about 0.4.

31. A method of making a film comprising the steps of:
   (1) coextruding a film through a die wherein the film comprises a core layer comprising a polyolefin wherein the core layer comprises the interior of the film; a first transition layer comprising a polyolefin and a silicone additive, wherein the first transition layer is exterior to the core layer; and a first skin layer comprising a polyolefin, and being substantially free of a silicone additive, wherein the first skin layer is exterior to the first transition layer, and wherein said first skin layer is exterior to the core layer, and wherein the first transition layer is between the core layer and the first skin layer;

(2) cooling/quenching the film; and (3) surface treating one or more exposed surfaces of the film with a corona, flame, or plasma treatment.

32. The method of claim 31 further comprising the step of orienting the film in the machine direction.

33. The method of claim 32 further comprising the step of orienting the film in the transverse direction.

34. A thermoplastic film comprising:

(a) a core layer comprising Ziegler-Natta catalyst-polymerized-polypropylene homopolymer, wherein the core layer comprises the interior of the film;

(b) a first tie layer exterior to and on one side of said core layer, said first tie layer comprising a silicon additive and a material selected from the group consisting of ethylene-propylene-butylene (EPB) terpolymers, ethylene-propylene (EP) copolymers, propylene-butylene random copolymers, linear low density polyethylenes, polypropylene homopolymer, and blends thereof;

(c) a first skin layer exterior to said core layer and said first tie layer, and on the same side of said core as said first tie layer, wherein said first skin layer comprises material selected from the group consisting of ethylene-propylene-butylene (EPB) terpolymers, ethylene-propylene (EP) copolymers, propylene-butylene random copolymers, linear low density polyethylenes, and blends thereof; and (d) a second skin layer exterior to said core layer and on a side of said core opposite to said first tie layer and first skin layer, wherein said second skin layer comprises a material selected from the group consisting of ethylene-propylene-butylene (EPB) terpolymers, ethylene-propylene (EP) copolymers, propylene-butylene (PB) random copolymers, linear low density polyethylenes, high density polyethylenes, medium density polyethylenes, polypropylene homopolymers, and blends thereof.

35. The film according to claim 34, wherein the second skin layer (d) is flame, plasma, or corona discharge treated.

36. The film according to claim 34, wherein the first skin layer (c) is flame, plasma, or corona discharge treated.

37. The film according to claim 35, wherein the first skin layer (c) is flame, plasma, or corona discharge treated.

38. A thermoplastic film comprising:

(a) a core layer comprising Ziegler-Natta catalyst-polymerized-polypropylene homopolymer, wherein the core layer comprises the interior of the film;

(b) a first tie layer exterior to and on one side of said core layer, said first tie layer comprising a silicon additive and a material selected from the group consisting of ethylene-propylene-butylene (EPB) terpolymers, ethylene-propylene (EP) copolymers, propylene-butylene random copolymers, polypropylene homopolymer, and blends thereof;

(c) a first skin layer exterior to said core layer and said first tie layer on the same side of said core as said first tie layer, wherein said first skin layer comprises material selected from the group consisting of ethylene-propylene-butylene (EPB) terpolymers, ethylene-propylene (EP) copolymers, propylene-butylene random copolymers, and blends thereof;

(d) a second tie layer exterior to said core layer and on a side of said core layer opposite to said first tie layer and first skin layer, said second tie layer comprising a silicon additive and a material selected from the group consisting of ethylene-propylene-butylene (EPB) terpolymers, ethylene-propylene (EP) copolymers, propylene-butylene random copolymers, polypropylene homopolymer, and blends thereof; and (e) a second skin layer exterior to said core layer and said second tie layer, and on a side of said core opposite to said first tie layer and first skin layer, wherein said second skin layer comprises a material selected from the group consisting of ethylene-propylene-butylene (EPB) terpolymers, ethylene-propylene (EP) copolymers, propylene-butylene (PB) random copolymers, and blends thereof.

39. The film according to claim 38, wherein the second skin layer (e) is flame, plasma, or corona discharge treated.

40. The film according to claim 38, wherein the first skin layer (c) is flame, plasma, or corona discharge treated.

41. The film according to claim 39, wherein the first skin layer (c) is flame, plasma, or corona discharge treated.

42. A thermoplastic film comprising:

(a) a core layer comprising Ziegler-Natta catalyst-polymerized-polypropylene homopolymer, wherein the core layer comprises the interior of the film;

(b) a first tie layer exterior to and on one side of said core layer, said first tie layer comprising a silicon additive and a material selected from the group consisting of ethylene-propylene-butylene (EPB) terpolymers, ethylene-propylene (EP) copolymers, propylene-butylene random copolymers, polypropylene homopolymer, and blends thereof;

(c) a first skin layer exterior to said core layer and said first tie layer on the same side of said core as said first tie layer, wherein said first skin layer comprises material selected from the group consisting of ethylene-propylene-butylene (EPB) terpolymers, ethylene-propylene (EP) copolymers, propylene-butylene random copolymers, and blends thereof;

(d) a second tie layer exterior to said core layer and on a side of said core layer opposite to said first tie layer and first skin layer, said second tie layer comprising a material selected from the group consisting of polypropylene homopolymer, maleic anhydride grafted polypropylene, and blends thereof; and (e) a second skin layer exterior to said core layer and said second tie layer, and on a side of said core opposite to said first tie layer and first skin layer, wherein said second skin layer comprises a material selected from the group consisting of amorphous polyamides, EVOH copolymers, high density polyethylenes, and blends thereof.

43. The film according to claim 42, wherein the second skin layer (e) is flame, plasma, or corona discharge treated.

44. The film according to claim 42, wherein the first skin layer (c) is flame, plasma, or corona discharge treated.

45. The film according to claim 43, wherein the first skin layer (c) is flame, plasma, or corona discharge treated.

46. The film of claim 42 wherein the exterior side of the second skin layer is vacuum metallized with aluminum.

47. The film of claim 43 wherein the the exterior side of the second skin layer is vacuum metallized with aluminum.

48. The film of claim 1, wherein said core layer further comprises an additive selected from the group consisting of:

an opacifying agent selected from the group consisting of iron oxide, carbon black, aluminum, $TiO_2$, talc, or combinations thereof, said opacifying agent present in said core layer in the range of from about 1 wt % to about 15 wt %, based on the total weight of the core layer;

a material selected from the group consisting of polybutene teraphthalate, nylon, solid glass spheres, hollow glass spheres, metal beads, metal spheres, ceramic spheres, CaCO₃, or combinations thereof, present in said core layer in the range of from about 1 wt % to about 20 wt %, said material having a mean particle size in the range of from 0.1–10 μm;

a hydrocarbon wax having a melting point in the range of from about 52° C. to about 88° C., and a molecular weight in the range of about 300 to about 800;

a hydrocarbon resin, said resin being one of petroleum resin, terpene resin, styrene resin, cyclopentadiene resin, saturated alicyclic resin, or combinations thereof, said resin having an average molecular weight of less than about 5000, having a softening point in the range of from about 60° to about 180° C., said resin present in said core layer at less than about 15 wt %; and combinations thereof.

49. The film of claim 34, wherein said core layer further comprises an additive selected from the group consisting of:

an opacifying agent selected from the group consisting of iron oxide, carbon black, aluminum, TiO₂, talc, or combinations thereof, said opacifying agent present in said core layer in the range of from about 2 wt % to about 4 wt %, based on the total weight of the core layer;

a material selected from the group consisting of polybutene teraphthalate, nylon, solid glass spheres, hollow glass spheres, metal beads, metal spheres, ceramic spheres, CaCO₃, or combinations thereof, present in said core layer in the range of from about 1 wt % to about 20 wt %, said material having a mean particle size in the range of from 0.1–10 μm;

a hydrocarbon wax having a melting point in the range of from about 52° C. to about 88° C., and a molecular weight in the range of about 300 to about 800;

a hydrocarbon resin, said resin being one of petroleum resin, terpene resin, styrene resin, cyclopentadiene resin, saturated alicyclic resin, or combinations thereof, said resin having an average molecular weight of less than about 5000, having a softening point in the range of from about 60° to about 180° C., said resin present in said core layer at less than about 15 wt %; and combinations thereof.

50. The film of claim 38, wherein said core layer further comprises an additive selected from the group consisting of:

an opacifying agent selected from the group consisting of iron oxide, carbon black, aluminum, TiO₂, talc, or combinations thereof, said opacifying agent present in said core layer in the range of from about 2 wt % to about 4 wt %, based on the total weight of the core layer;

a material selected from the group consisting of polybutene teraphthalate, CaCO₃, or combinations thereof, present in said core layer in the range of from about 2 wt % to about 10 wt %, said material having a mean particle size in the range of from 0.1–10 μm;

a hydrocarbon resin, said resin being one of petroleum resin, terpene resin, styrene resin, cyclopentadiene resin, saturated alicyclic resin, or combinations thereof, said resin having an average molecular weight of less than about 5000, having a softening point in the range of from about 60° to about 180° C., said resin present in said core layer at less than about 10 wt %; and combinations thereof.

51. The film of claim 42, wherein said core layer further comprises from about 2 wt % to about 10 wt % of polybutene terephthalate, said polybutene terephthalate having a mean particle size in the range of from about 0.1 to about 10 μm.

52. A thermoplastic film comprising:

(a) a core layer comprising a polypropylene homopolymer wherein the core layer comprises the interior of the film;

(b) a first transition layer comprising a material selected from the group consisting of ethylene-propylene-butylene (EPB) terpolymers, ethylene-propylene (EP) copolymers, propylene-butylene random copolymers, linear low density polyethylenes, polypropylene homopolymer, and blends thereof; and a silicone additive, wherein the first transition layer is exterior to the core layer, and wherein the silicone additive has a viscosity greater than about 1,000,000 centistokes;

(c) a first skin layer comprising a material selected from the group consisting of ethylene-propylene-butylene (EPB)terpolymers, ethylene-propylene (EP) copolymers, propylene-butylene random copolymers, linear low density polyethylenes, and blends thereof, wherein the first transition layer is between the first skin layer and the core layer; and (d) a second skin layer comprising a material selected from the group consisting of ethylene-propylene-butylene (EPB) terpolymers, ethylene-propylene (EP) copolymers, propylene-butylene (PB) random copolymers, linear low density polyethylenes, high density polyethylenes, medium density polyethylenes, polypropylene homopolymers, amorphous polyamides, EVOH copolymers and blends thereof, wherein the second skin layer is exterior to said core layer and on a side of said core opposite to said first transition layer and first skin layer.

53. The film of claim 52 wherein the silicone additive has a viscosity from about 10,000,000 centistokes to about 50,000,000 centistokes.

54. The film of claim 52 further comprising a second transition layer, wherein said second transition layer is between said core layer and said second skin layer, and wherein said second transition layer comprises a silicon additive and a material selected from the group consisting of ethylene-propylene-butylene (EPB) terpolymers, ethylene-propylene (EP) copolymers, propylene-butylene random copolymers, polypropylene homopolymer, and blends thereof.

55. The film of claim 54 wherein the silicone additive has a viscosity from about 10,000,000 centistokes to about 50,000,000 centistokes.

56. The film of claim 52 a second transition layer, wherein said second transition layer is between said core layer and said second skin layer, and wherein said second transition layer comprises a material selected from the group consisting of polypropylene homopolymer, maleic anhydride grafted polypropylene, and blends thereof.

57. The film of claim 56 wherein the silicone additive has a viscosity from about 10,000,000 centistokes to about 50,000,000 centistokes.

58. A thermoplastic film comprising:

(a) a core layer comprising a polyolefin wherein the core layer comprises the interior of the film;

(b) a first transition layer comprising a polyolefin and a silicone additive, wherein the first transition layer is exterior to the core layer; and (c) a first skin layer comprising a polyolefin wherein the first skin layer is exterior to the first transition layer and the core layer, and wherein the first skin layer has an exposed surface and wherein the exposed surface of the first skin layer is subjected to a treatment selected from the group consisting of corona discharge, plasma, and flame, wherein the film has a seal strength of said first skin layer of at least about 200 grams per inch and has a coefficient of friction of at most about 0.65, and wherein the first transition layer is between the first skin layer and the core layer.

59. The film of claim 58 having a seal strength of said first skin layer of at least about 240 grams per inch and having a coefficient of friction of at most about 0.4.

60. The film of claim 58 wherein the polyolefin of the core layer comprises polypropylene homopolymer; wherein the polyolefin of the first transition layer comprises a material selected from the group consisting of ethylene-propylene-butylene (EPB) terpolymers, ethylene-propylene (EP) copolymers, propylene-butylene random copolymers, linear low density polyethylenes, polypropylene homopolymer, and blends thereof, wherein the first skin layer comprises material selected from the group consisting of ethylene-propylene-butylene (EPB) terpolymers, ethylene-propylene (EP) copolymers, propylene-butylene random copolymers, linear low density polyethylenes, and blends thereof; and wherein the film further comprises a second skin layer exterior to said core layer and on a side of said core opposite to said first transition layer and first skin layer, wherein said second skin layer comprises a material selected from the group consisting of ethylene-propylene-butylene (EPB) terpolymers, ethylene-propylene (EP) copolymers, propylene-butylene (PB) random copolymers, linear low density polyethylenes, high density polyethylenes, medium density polyethylenes, polypropylene homopolymers, and blends thereof.

61. The film of claim 60 having a seal strength of said first skin layer of at least about 240 grams per inch and having a coefficient of friction of at most about 0.4.

62. The film of claim 58 wherein the a core layer comprises polypropylene homopolymer; wherein the first transition layer comprises a material selected from the group consisting of ethylene-propylene-butylene (EPB) terpolymers, ethylene-propylene (EP) copolymers, propylene-butylene random copolymers, polypropylene homopolymer, and blends thereof; wherein the first skin layer comprises material selected from the group consisting of ethylene-propylene-butylene (EPB) terpolymers, ethylene-propylene (EP) copolymers, propylene-butylene random copolymers, and blends thereof; wherein said film further comprises a second transition layer exterior to said core layer and on a side of said core layer opposite to said first transition layer and first skin layer, said second transition layer comprises a silicon additive and a material selected from the group consisting of ethylene-propylene-butylene (EPB) terpolymers, ethylene-propylene (EP) copolymers, propylene-butylene random copolymers, polypropylene homopolymer, and blends thereof; and wherein said film further comprises a second skin layer exterior to said core layer and said second transition layer, and on a side of said core opposite to said first transition layer and first skin layer, wherein said second skin layer comprises a material selected from the group consisting of ethylene-propylene-butylene (EPB) terpolymers, ethylene-propylene (EP) copolymers, propylene-butylene (PB) random copolymers, and blends thereof.

63. The film of claim 62 wherein the second skin layer has an exposed surface and wherein the exposed surface of the second skin layer is subjected to a treatment selected from the group consisting of corona discharge, plasma, and flame.

64. The film of claim 63 having a seal strength of both said first skin layer and said second skin layer of at least about 240 grams per inch and having a coefficient of friction of at most about 0.4.

65. The film of claim 58 wherein the core layer comprises polypropylene homopolymer; wherein the first transition layer comprises a material selected from the group consisting of ethylene-propylene-butylene (EPB) terpolymers, ethylene-propylene (EP) copolymers, propylene-butylene random copolymers, polypropylene homopolymer, and blends thereof; wherein the first skin layer comprises material selected from the group consisting of ethylene-propylene-butylene (EPB) terpolymers, ethylene-propylene (EP) copolymers, propylene-butylene random copolymers, and blends thereof; wherein said film further comprises a second transition layer exterior to said core layer and on a side of said core layer opposite to said first transition layer and first skin layer, said second transition layer comprising a material selected from the group consisting of polypropylene homopolymer, maleic anhydride grafted polypropylene, and blends thereof; and wherein said film further comprises a second skin layer exterior to said core layer and said second transition layer, and on a side of said core opposite to said first transition layer and first skin layer, wherein said second skin layer comprises a material selected from the group consisting of amorphous polyamides, EVOH copolymers, high density polyethylenes, and blends thereof.

66. The film of claim 65 having a seal strength of said first skin layer of at least about 240 grams per inch and having a coefficient of friction of at most about 0.4.

* * * * *